(12) United States Patent
Novak (10) Patent No.: US 10,479,968 B2
(45) Date of Patent: Nov. 19, 2019

(54) SINGLE STAGE WINEMAKING APPARATUS AND METHOD

(71) Applicant: Gary F. Novak, Calgary (CA)

(72) Inventor: Gary F. Novak, Calgary (CA)

(*) Notice: Subject to any disclaimer, the term of this patent is extended or adjusted under 35 U.S.C. 154(b) by 0 days.

(21) Appl. No.: 15/892,862

(22) Filed: Feb. 9, 2018

(65) Prior Publication Data

US 2019/0017003 A1    Jan. 17, 2019

(30) Foreign Application Priority Data

Mar. 23, 2017  (CA) ........................... 2961779

(51) Int. Cl.
*C12G 1/036*  (2006.01)
*C12G 1/02*  (2006.01)

(52) U.S. Cl.
CPC ................... *C12G 1/0206* (2013.01)

(58) Field of Classification Search
CPC ............... C12G 1/0206; C12C 13/10
USPC ................ 99/276, 275; 426/11, 15
See application file for complete search history.

(56) References Cited

U.S. PATENT DOCUMENTS 3,946,780 A * 3/1976 Sellers ............... B65D 51/1616
                                                                 383/66
4,474,890 A * 10/1984 Rieger ............... B01F 7/00008
                                                                 435/298.1

FOREIGN PATENT DOCUMENTS

| CA | 2961779 A1 * | 5/2017 | .......... C12G 1/0203 |
| CN | 203498358 | 3/2014 | |
| CN | 103666900 B * | 1/2015 | |

* cited by examiner

*Primary Examiner* — Vera Stulii
(74) *Attorney, Agent, or Firm* — Kyle R Satterthwaite; Ryan W Dupius; Ade & Company Inc.

(57) ABSTRACT

A novel fermentation method uses a novel single stage horizontal cylindrical or partial cylindrical fermentor, larger in volume than the target volume of wine, which bounds the entire winemaking process. Fermentor has at least one opening for ingredient insert/removal, one-way venting gaseous closure, fermentor tilting prop, cavity space and bottling tap. Fermentor's cavity space and convex curvature underside provides for a fermentor rocking motion creating agitation and splashing for mixing the wine must and inducing ambient air/oxygen therein. A cavity space for fermentation foam expansion, heavier fermentation emitted $CO_2$ gas purges out the ambient air/oxygen then retains $CO_2$ gas providing a safe substantially oxygen free environment for a manually applied to the fermentor rocking motion creating agitation and splashing for mixing, degassing and resting the wine to clear in a safe substantially oxygen free environment until ready for direct bottling via bottling tap.

14 Claims, 2 Drawing Sheets

FIGURE 4

SINGLE STAGE WINEMAKING APPARATUS AND METHOD

FIELD OF INVENTION

A single stage fermentor apparatus and simplified method for home winemaking and other fermented alcoholic beverages.

BACKGROUND

Home wine making has been here for thousands of years with really no changes in the basic fermentation equipment and methods.

The past fermentation art traditionally used fruits crushed into juice. Vegetables and grains have also been used to make wine and other fermented beverages. Today wines are still traditionally made from fruits, but the majority are now made from manufactured wine kits made from processed fruits.

While winemaking is a not an exact science and may be varied, the following steps are typical of a commonly employed home wine making method. Wine kits, or fruits crushed into a wine must, are poured into an initial open vertical cylindrical primary pail fermentor with a cover. The volume of wine must poured into the primary pail fermentor is selected according to a specific volume of a separate secondary fermentor, typically referred to as a carboy or demijohn. The primary pail fermentor is then placed in an elevated position, where the wine must undergoes primary fermentation, then is transferred by siphoning with a hose into the air-protected and vented secondary fermentor, and the secondary fermentor is then placed in a elevated position where fermentation process is completed.

Once fermentation is complete the wine is transferred by siphoning again with a hose into a primary pail fermentor for mixing stabilizers, finings and then degassing. The primary fermentor is then placed in an elevated position and its contents are siphoned back into an air-protected and vented secondary fermentor. The secondary fermentor is then placed in a elevated position where the wine is left to rest and clear. Once clear the wine is transferred by siphoning again with a hose into bottles or other containers.

This multi-stage alternating between two fermentors requires the repetitive lifting, including lifting of a heavy wine kit poured into the primary, and lifting of the wine must-filled or wine-filled primary pail fermentors and secondary fermentors.

Transferring of wine by siphoning results in air exposure, with opportunity for oxidization and contamination, thus representing another shortcoming of the conventional multi-stage winemaking method.

Cleaning and sanitizing of all the containers, hoses, tubes, hydrometers, spoons, brushes and other equipment prior to coming into contact with the wine must or wine is repetitive and laboursome work, necessary to prevent contamination.

Mixing and degassing of the wine by manual vigorous spoon stirring or mechanical stirring device in the primary pail or secondary fermentor also results in air exposure with opportunity for oxidization and contamination, thus representing another shortcoming of the conventional multi-stage winemaking method.

Improvements to increase the ease of the winemaking process have resulted in the need to collect more and more winemaking equipment.

Wine is typically bottled by siphoning from an elevated secondary fermentor or primary pail fermentor via a hose into sanitized bottles or other containers.

For many, making wine is not user friendly, as it requires notable strength to lift a heavy wine kit, and one or more wine must-filled or wine-filled primary pails fermentors and secondary fermentors, which is overwhelming or impossible for some winemakers and would-be winemakers. The space required for making wine by these conventional methods may be not be available in one's home. Additionally, the process of cleaning and sanitizing, introducing the wine must to the primary, siphoning, mixing and degassing is all messy work, and so winemaking has generally been restricted to basements or other hidden-away settings.

SUMMARY OF INVENTION

According to one aspect of the invention, there is provided a fermentor apparatus comprising:

a fermentor having an interior space delimited between two end walls spaced apart along a longitudinal axis and a peripheral wall structure closing around said longitudinal axis, said peripheral wall structure comprising top and bottom halves for respectively facing upwardly away from and downwardly toward a support surface when said fermentor is supported atop said support surface in a working position orientating said longitudinal axis generally along said support surface, and a convexly curved bottom surface residing externally of the fermentor and underlying the bottom half of the peripheral wall structure to enable rocking motion of the fermentor back and forth on said support surface by rolling contact between said convexly bottom surface and the support surface;

at least one opening communicating with the interior space of the fermentor through the top half of the peripheral wall structure to enable insertion and removal of wine must ingredients into and out of the interior space of the fermentor said at least one opening including a vent opening;

a one-way venting closure operable at the vent opening to enable venting of gaseous substances out of the fermentor while preventing ambient gaseous substances from entering the fermentor from an outside environment and retaining fermentation emitted $CO_2$ gas within the cavity space; and a dispenser opening communicating with the interior space of the fermentor at a bottom half thereof; and a bottling tap operably connected at the dispenser opening to enable dispensing of fermented product from the fermentor.

An open state of the fermenter is achievable by removal of the one-way venting closure to enable the insertion and removal of ingredients to and from the fermentor through the vent opening.

Alternatively, there at least one opening may additionally comprise an access opening of greater size than said vent opening, in which case the open state of the fermenter is also achievable by removal of a separate access closure from the access opening to enable the insertion and removal of ingredients to and from the fermentor through the larger access opening. The vent opening may be provided in the access closure, whereby removal of the access closure also removes the one-way venting closure.

In a closed state of the fermenter, the one-way venting closure and the optional access closure, if included, are engaged with the respective openings to enclose the interior space of the fermentor.

According to another aspect of the invention, there is provided a method of fermenting wine in a single stage fermentor having a convexly curved bottom surface residing externally of the fermentor at an underside thereof to enable rocking motion of the fermentor back and forth on a generally horizontal support surface by rolling contact between said convexly curved bottom surface and the support surface, said method comprising the steps of:

a) with the fermentor in a working position supported atop the generally horizontal support surface with a longitudinal axis of the single container lying more parallel than perpendicular to said support surface, combining wine must liquid ingredients in the fermentor in amounts only partially filling said fermentor so as to leave an upper cavity space within said container unoccupied;
b) with said fermentor in said working position and in a closed state, applying a back and forth rocking motion to the fermentor by rolling contact between the convexly curved bottom surface of the fermentor and the underlying support surface, thereby agitating and splashing said wine must ingredients to perform mixing of the wine must ingredients and inducing/dissolving initial ambient air/oxygen yeast nutritional value into the wine must;
c) with said fermentor in a open state, adding yeast directly onto the wine must inside said fermentor;
d) with the fermentor once again in the closed state in the working position, maintaining a fermentation temperature range of the yeast to initiate and maintain fermentation, and during said fermentation, periodically re-applying said back and forth rocking motion to stir up yeast lees and wet and punch down any solid fermentables present in the fermentor;
e) during fermentation, using the cavity space to accommodate fermentation created foam and using fermentation emitted heavier $CO_2$ gas from the fermentation to purge original ambient air/oxygen out of the fermentor through a one way venting closure and fill and retain said fermentation emitted $CO_2$ gas within the cavity space, thereby rendering said cavity space substantially free of oxygen;
f) after an adequate waiting period, ensuring fermentation is complete to a desired sweetness by checking specific gravity or taste sampling the wine; and
g) having confirmed fermentation is complete, and with the fermentor in the closed state and the working position and said cavity space substantially free of oxygen, re-applying said back and forth rocking motion to mix and degas the wine through agitation and splashing, thereby releasing dissolved $CO_2$ gas from the wine, and venting the released $CO_2$ gas from the fermentor;

According to another aspect of the invention, a unique fermentor apparatus and unique method for wine making and other fermented beverages that overcomes the difficulties described in the background by using a single stage, nearly horizontal, slightly tilted cylindrical or partially cylindrical fermentor that is larger in volume than the volume of wine being made so as to provide a cavity space within the fermentor. The complete winemaking process takes place entirely within this fermentor, and thus is bound within an absolute clean environment. Once the wine must is introduced into the fermentor, a back and forth rocking motion of the fermentor is performed atop a countertop, tabletop, or other horizontal support surface creates adequate agitation and splashing of the wine must to mix the ingredients and inducing/dissolving original ambient air/oxygen yeast nutritional value into the wine must. Contained optional solid fermentables and non fermentable are added into the fermentor. Yeast is added onto the temperature controlled wine must, and as fermentation takes place, the heavier fermentation emitted $CO_2$ gas purges the original ambient air/oxygen out of the fermentor, providing a safe substantially free of oxygen environment. A back and forth rocking motion is preformed periodically to stir up yeast lees, wet and punch down any optional fermentable solids such as, grape skins etc. prior to stabilization.

At or near completion of fermentation all contained solid fermentables are removed, solid non fermentable ingredients maybe removed now or left until completion of fermentation, the wine is left to finish fermenting including the fermentable juice left behind from the removal of the solid fermentables. the fermentation emitted $CO_2$ gas retained in the cavity space allows for safe repetition of the back and forth rocking motion to create adequate agitation and splashing of the wine in order to mix in fermentation stabilizer(s), fining agent(s), other wine ingredient (s), and to degas the dissolved $CO_2$ gas out of the body of wine without oxidization and/or contamination. The wine is then left to rest to settle the lees and clarify in a safe $CO_2$ controlled, substantially free of oxygen environment, generally 14 days. Once the wine is crystal clear, it is tapped directly into bottles or other containers from the fermentor.

Such embodiments featuring the unique single stage slightly tilted cylindrical or partial cylindrical fermentor and associated method that overcome the disadvantages and drawbacks of making wine and other fermented beverages as described in the background by:

a) optionally eliminating manual lifting and pouring of a heavy wine kit (if used) by use of a bladder siphon to fill the fermentor;
b) eliminating the need of repetitive manual lifting of wine must and wine filled primary pail(s) and secondary fermentor carboy(s) from floor to counter for siphoning by using the single stage fermentor;
c) having the option to make wines made from wine kits stronger or weaker by adjusting the volume of water added into the initial wine kit must without having to restrict the volume of wine must according to the volume of a secondary fermentor (carboy);
d) eliminating detrimental oxidation by maintaining a controlled fermentation emitted $CO_2$ gas, substantially free of oxygen environment within a single stage fermentor;
e) eliminating repetitive cleaning and sanitizing of equipment to prevent contamination by maintaining an absolute clean environment within the single stage fermentor;
f) eliminating the use of a manual spoon or mechanical stirring device for mixing the wine must, stirring up yeast lees and wet and punch down any solid fermentables, mixing stabilizers, finings, and degassing the dissolved fermentation $CO_2$ gas out of the body of the wine, by manually or mechanically applying a back and forth rocking motion to the fermentor apparatus, thereby creating adequate agitation and splashing within a substantially free of oxygen environment;
g) tapping wine directly into sanitized bottles or other containers without siphoning by using a bottling tap on the fermentor; and
h) providing a unique fermentor and method to make winemaking user friendly in homes of all sizes and configurations for people of all physical strengths.

BRIEF DESCRIPTION OF THE DRAWINGS

One preferred embodiment of the invention will now be described in conjunction with the accompanying drawings in which.

DETAILED DESCRIPTION

Fermentor Apparatus

Fermentor is a unique home wine making single stage generally horizontal cylindrical fermentor featuring a singular container 1 that is at least partially cylindrical in shape. The container 1 has front and rear end walls 1a, 1b spaced apart from one another along a longitudinal central axis that perpendicularly intersects the end walls. A peripheral wall structure 1c and 1d closes around the longitudinal axis between the two end walls to cooperate therewith to delimit the interior space of the container 1. The interior space of the container has a greater volumetric size than an intended volume of wine to be made, whereby an empty cavity space 8 is left inside the fermentor above the surface of the wine must 9 once introduced into the fermentor.

This cavity space 8 accommodates creation and expansion of fermentation foam, fermentation emitted $CO_2$ gas 12 retention and provides room for agitation and splashing of the wine must by manually applying a back and forth rocking motion 10 to the fermentor about its longitudinal axis for the purpose of mixing the wine must ingredients and introducing original ambient air/oxygen yeast nutritional value into the wine must 9 for a healthy yeast respiration at fermentation start up.

Once the fermentation is complete, fermentation emitted $CO_2$ gas 12 occupies the cavity space 8 to provide substantially free of oxygen environment while manually applying a back and forth rocking motion 10 to the fermentor about its longitudinal axis for the purpose of creating adequate agitation and splashing for mixing in fermentation stabilizer(s), fining/clarifying agent(s) and degassing dissolved $CO_2$ gas out of the body of the wine 11 and out of the fermentor through the one way venting closure 4. Relying on a one way venting closure 4, the remaining fermentation emitted $CO_2$ gas 12 is retained in the cavity space 8, protecting the wine 11 in a substantially free of oxygen environment, preventing detrimental oxidation during the resting and clarifying period.

The rear wall 1b of the container 1 is circular in shape, while the opposing front wall 1a has a truncated circular shape. A cylindrical rear portion 1c of the peripheral wall structure spans part of the container 1 axial length from the circular rear end wall 1b toward the truncated circular front end wall 1a, and terminates at the plane of an intermediate wall 1f. The truncated front wall 1a is slightly shorter than the circular rear wall 1b, with a top end of the otherwise circular shape of the front wall 1a being cut off at a horizontal chord line of said circular shape to create a flat upper edge of the front end 1a wall.

A flat-topped front portion 1e of the peripheral wall 1d spans axially forward from the intermediate wall 1f to the truncated front end wall 1a.

Peripheral wall 1d has a cylindrical curvature over most of its circumference with the exception of the flat-topped front portion 1e. The intermediate wall 1f stands upright from the rear of the flat-topped front portion 1e. Flat-topped front portion 1e is parallel to the longitudinal axis of the container 1 and coplanar with the flat upper edge of the truncated front wall 1a. The cylindrical lower curvature portion of peripheral wall 1d is coincident with the cylindrical lower curvature of peripheral wall 1c so as to form a continuous extension thereof over a majority of the container 1 circumference.

An imaginary mid-plane cuts the container into top and bottom halves along the longitudinal axis. At the cylindrical rear portion of the container 1c, the top and bottom halves are equal semi-cylindrical halves that mirror one another across the mid-plane, while at the flat-topped front portion of the container 1d, the upper half is differently shaped and slightly smaller than the lower half due to the truncated top end thereof, where the arcuate top curvature present at the remainder of the container is replaced by the flat-topped front portion 1e that truncates this front portion of the container relative to the cylindrical rear portion. It will be appreciated that the term "half" is used not in its specific sense to mean 50% of a whole, but merely one of two parts that collectively make the whole.

An access opening 2 penetrates the flattened top surface 1e of the front portion 1d of the container in order to communicate with the container's interior space. The illustrated embodiment shows a collar-like rim 2a upstanding from the flattened upper surface 1e around the access opening 2 to accommodate an access closure 3 to selectively open and seal close the access opening. In other embodiments, the rim 2a may instead be recessed into top half of the container or simply be a circular hole through the container 1 for mating with a plug style closure.

The access opening 2 is large enough for the insertion and removal of winemaking ingredients that are combined inside the fermentor to make the wine must 9. When mated with the rim 2a of the access opening 2, the access closure 3 fully seals the access opening 2 in an air tight manner.

A vent opening 5 penetrates through the access closure 3 to enable the connection of the one-way venting closure 4. Alternatively, the vent opening 5 may penetrate the top half of the container 1 at a discrete location separate from the access closure 3.

A one-way venting closure 4 connects directly to the vent opening 5 and prevents ambient air/oxygen from entering the interior space of the fermentor, while allowing original ambient air/oxygen and fermentation-emitted $CO_2$ gas 12 to vent out of the fermentor during the fermentation. The one-way venting closure 4 vents the dissolved $CO_2$ gas released from the body of the wine 11 during degassing process. The one way venting closure 4 is pressure operated so that this venting occurs only above a predetermined pressure limit, such that the remaining fermentation emitted $CO_2$ gas 12 is retained in the cavity space 8, thereby providing a substantially free of oxygen environment for the wine 11 during the mixing of stabilizers, finings, and the degassing of the wine and then provide a substantially free of oxygen environment during the resting period to settle lees 14 and clarify the wine 11.

A dispenser opening 6 through the front wall near the bottom end thereof to communicate with the interior space of the container at the lower half thereof, and thereby enable discharge of wine therefrom via a bottling tap 7 connected directly to the dispenser opening 6.

By default, the fermentor is normally maintained in a slightly titled orientation in which its longitudinal axis of the fermentor slopes downwardly at a small angle from the front end of the fermentor to the opposing rear end thereof.

To achieve this sloped orientation of the fermentor, the illustrated embodiment uses fermentor tilting prop 13 that resides at the front end of the fermentor in a manner elevating the front end and tilting the rear end of the fermentor downward, thus drawing the majority of the sediment 14 of settled lees during the resting/clearing period of the wine 11 to the rear of the fermentor, thus simplifying bottling of the wine in a sediment-free manner.

To accomplish this, the fermentor tilting prop 13 of the illustrated embodiment is integrally incorporated into the container shape itself or is a separate fermentor tilting prop 13 fitted there onto the front portion of the cylindrically contoured portion of the peripheral wall structure 1d adjacent the front end wall 1a of the container. The fermentor tilting prop 13 spans between its two ends 13a to 13b around the longitudinal axis of the container. In other embodiments, the fermentor tilting prop 13 may be a full ring encircling the entire circumference of the container.

Likewise, while the illustrated embodiment features a flat-topped front portion 1e of reduced elevation compared to the apex of the cylindrical remainder 1c of the container for easier placement of the access opening 2. Other embodiments may have other container shapes, such as a more conventional drum shape of uniformly cylindrical structure throughout.

At the front end of the container, the fermentor tilting prop 13 enlarges the radial measure of the container's 1 front portion peripheral wall structure 1d. The fermentor tilting prop 13 sits on a countertop, table-top, or other generally horizontal support surface on which the fermentor is seated, thus elevating the front end of the fermentor relative to the rear end thereof.

A lowermost area 13c of the fermentor tilting prop 13 (i.e. at the six o'clock position around the container's circumference) is flattened, thus marking a deviation from a cylindrically contoured remainder of the fermentor tilting prop's outer surface. Accordingly, this flattened lowermost area 13c of the fermentor tilting prop 13 sits flush atop the horizontal support surface to stabilize the fermentor against inadvertent rolling on the support surface. The cylindrically contoured remainder of the fermentor tilting prop 13 on the other hand provides convex outer surface areas 13d and 13e spanning outward and upward to ends 13a and 13b from the flattened lowermost area on opposite sides thereof, such that rocking of the fermentor about its longitudinal axis will transition these convex outer surface areas into rolling contact with the support surface. Together with the convex cylindrical contour of the bottom half of the fermentor at the rear end wall 1b thereof that rests on the support surface, and these convex outer surface areas spanning from 13d to 13e of the fermentor tilting prop enable smooth, easily performed manually applied back and forth rocking motion of the fermentor on the support surface.

While manual application of the rocking motion is referenced herein, for example enabling low-cost marketing of an entry-level version relying on manual user input for the rocking motion, other embodiments may incorporate a mechanism operable to provide powered automation of the necessary rocking motion.

Figures 1, 2, 3:
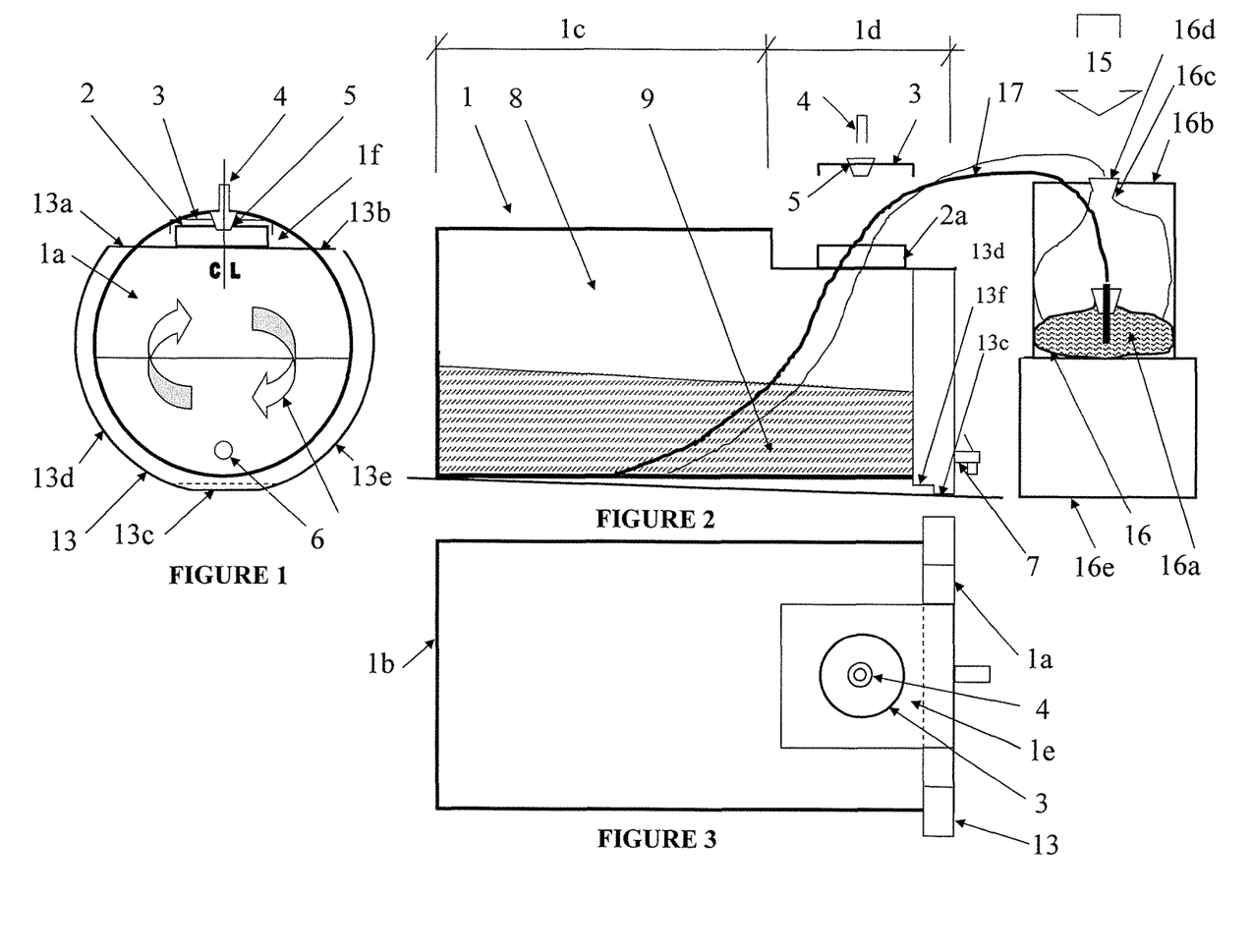
FIG. 1 is a single stage fermentor apparatus using a singular container of generally horizontal cylindrical shape seated atop a counter or other horizontal support surface compliant to a back and forth rocking motion thereon at various stages of the winemaking process for mixing and degassing purposes.
FIG. 2 is a side view of the fermentor apparatus during introduction of wine must into same.
FIG. 3 is a top view of the fermentor apparatus.
Figure 4:
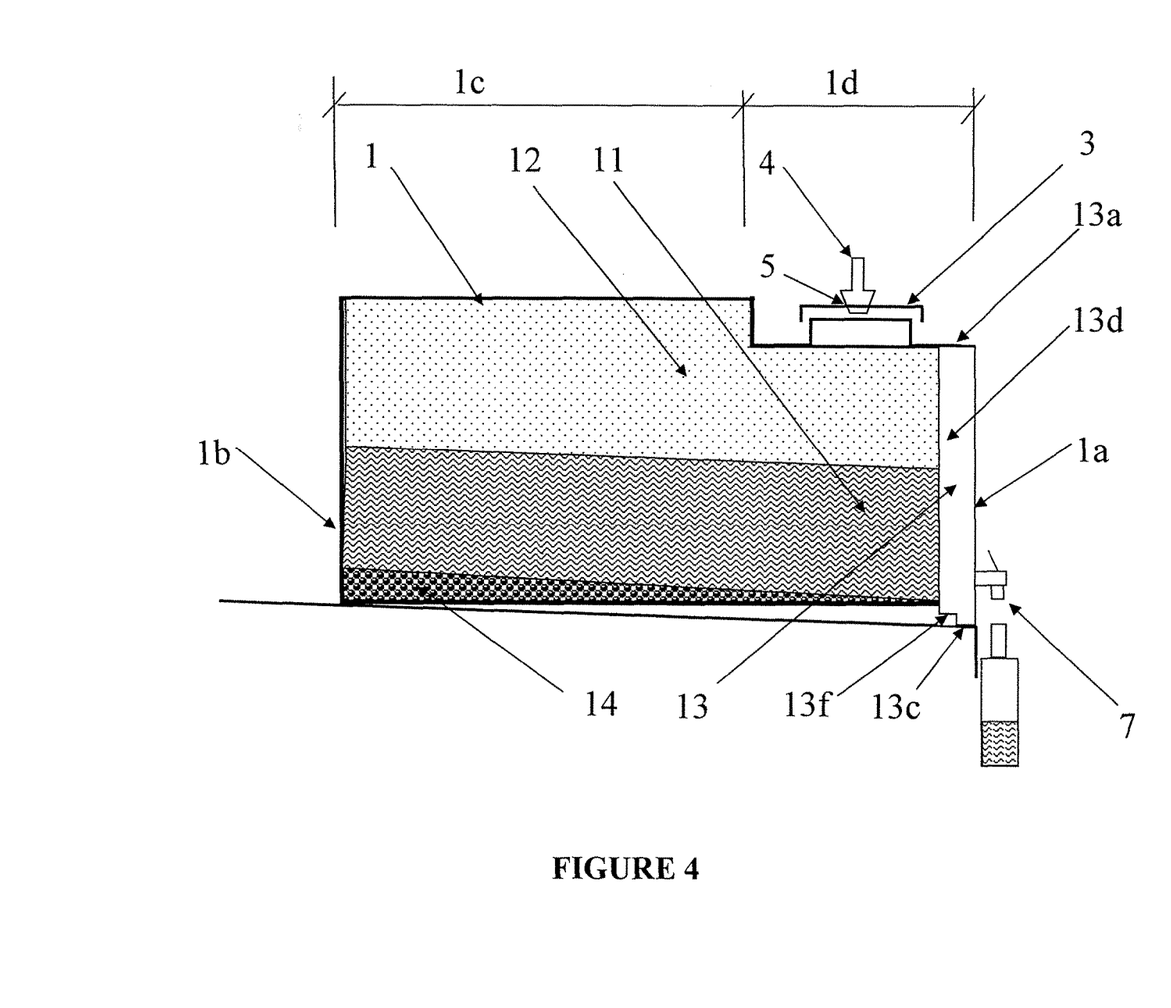
FIG. 4 is a side view of the fermentor apparatus during fermentation, resting to clear the wine and bottling.

The bottom of the fermentor tilting prop 13 has an optional stepped profile 13f best seen in FIG. 2, whereby in addition to the flattened lowermost area 13c of the fermentor tilting prop 13 that normally sits atop the support surface, an adjacent underside area 13f of the fermentor tilting prop 13 situated just behind the lowermost area 13c is slightly elevated therefrom. This adjacent underside area 13f is also flat, and is parallel to the lowermost area 13c.

This way, the fermentor tilting prop 13 step-profiled underside 13c can be placed in an overhanging position over the edge or lip of a countertop or table to step lower the front end of the fermentor, and later the fermentor can step lowered even further onto the bottom of the fermentor walls 1c and 1d in order to gradually lower the front end of the fermentor to minimize sediment disturbance during the bottling procedure.

This use of a fermentor tilting prop whether separately fitted there onto over the front end thereof or integrally incorporated into the container shape itself, is just one example of a fermentor tilting prop for achieving a tilted stable default position of the fermentor, In other embodiments, a fermentor tilting prop likewise achieving a tilted fermentor orientation and a stabilized default position while also enabling smooth manually applied back and forth rocking motion could be positioned further back on the fermentor.

Other fermentor tilting prop configurations may alternatively be employed, such as an inclined base tray placed atop the support surface for seating the fermentor atop the base tray in an inclined position relative to the underlying horizontal support surface.

Other examples of a fermentor tilting prop configurations may include a flat top inclined base tray with a convex underside placed atop the horizontal support surface for back and forth rocking motion thereon, with a rectangular fermentor seated atop the base tray in an inclined position relative to the underlying horizontal support surface. From this, it will be appreciated that the convexly curved bottom of the fermentor that enables the smooth rocking motion thereof need not be a seamlessly integral part of a unitary single-piece fermentor structure.

Alternatively, a simple length of dimension lumber, such as a 1×4, placed perpendicular to the longitudinal axis of a convex-bottom fermentor at or near the front wall may be used as the fermentor tilting prop to elevate the front end of the fermentor. A stepped bottom profile like that of the illustrated embodiment may be created by attaching a narrower length to the underside of the first, e.g. a 1×2. Alternatively, the fermentor may lack any type of tilting prop, though with the recognition that some of the last bottles filled may be subject to sediment.

The entire fermentor apparatus described above is made of government approved material for making wine 11.

Method

Having described the structure of the single stage fermentor apparatus, attention is now turned to the corresponding single-stage winemaking process that requires no transition between different fermentors.

The following steps are of an exemplary embodiment specific to relatively quick wines made in less than 8 weeks. In such scenarios, such as with wine kits, the addition of stabilizers is mandatory to ensure fermentation termination, and the addition of fining agents flocculates the particles and accelerates the clearing of the wine within this time frame. Those skilled in the art of making wine and other fermented beverages may adopt other methods to achieve their desired end results while still using the beneficial single-stage fermentor apparatus of the present invention.

1. Firstly, all equipment that will be in contact with the wine must 9 or wine 11 is sanitized.
2. Next, wine must 9 is introduced into the fermentor as follows.
   a) In the open state of the fermentor with access closure 3 removed, hot water and optional bentonite are introduced into the fermentor through access opening 2, and swooshed around to disperse and suspend the bentonite within the water.
   b) In the open state of the fermentor with access closure 3 removed with access closure 3 removed, the wine must liquid ingredients are introduced into the fermentor, leaving optional additional solid fermentable and non fermentable ingredients for later insertion. If a wine kit is used to make the wine, a bladder bag siphon 17 may be used to transfer the wine kit wine must ingredient 16a from a wine kit bladder bag 16 into the fermentor. The bladder bag siphon 17 is of a known type, such as that described in U.S. Pat. No. 2,618,409, wherein a wine kit bladder bag 16 containing the wine must ingredient 16a is situated inside a rigidly-walled box 16b, The rigidly-walled box 16b with wine kit bladder bag 16 is placed next to the fermentor, the wine kit bladder bag siphon 17 dispensing tube end is inserted to the bottom of the fermentor through the access opening 2, and the bladder bag siphon 17 tube's source end is inserted into the wine kit bladder bag 16. The bladder bag siphon sealing closure 16d is air sealed to the dispensing and source tube and air sealed to the wine kit bladder bag spout 16c. Downward force 15 is applied to the bladder bag siphon sealing closure 16d to apply pressure to the wine kit bladder bag 16, which fills the bladder bag siphon 17 with the wine kit must 16a and starts the siphoning action, which continues siphoning the wine kit must 16a into the fermentor. Once the level of wine must becomes the same in the fermentor as in the wine kit bladder bag initial siphoning will stop. The now lighter wine kit bladder bag 16 within the rigidly-walled box 16b is lifted up onto the riser platform 16e, which is high enough to siphon the remaining volume of wine kit wine must 16a into the fermentor. Alternatively the wine kit could be lifted up onto the riser platform initially to create a one-step siphoning procedure.
   c) If a wine kit is used to make the wine, temperature controlled water is added to the wine must 9 in the fermentor via the access opening 2 to achieve a good yeast fermentation start temperature, and filled to the specified or desired level. Some wine kits, and wines not made from a wine kit, that do not require water should instead be warmed to achieve a good yeast fermentation start temperature.
   d) Access cap 3 is re-engaged to seal close the access opening 2 and thereby place the fermentor in its closed state. A manually applied back and forth rocking motion 10 exerted onto the fermentor creates adequate agitation and splashing for thorough mixing of the wine must 9 ingredients, and for inducing/dissolving original ambient air/oxygen yeast nutritional value into the wine must 9.
   e) In the open state of the fermentor with the access cap 3 removed, optional additional solid fermentable ingredients such as, grape skins, berries, etc., and optional additional solid non-fermentable ingredients such as, loose oak chips, solid oak blocks, sticks or spirals or other optional solid ingredient and are individually contained loosely in separate gaze-mesh bag(s) or perforated container(s), which are then inserted into the interior of the fermentor through the access opening 2 thereof.
   f) Yeast is carefully added through the access opening 2 directly onto the wine must 9, and the access cap 3 is re-engaged to the access opening 2 at rim 2a to return the fermentor to its closed state.
3. Fermenting the wine must 9.
   a) The wine must 9 is maintained at the yeast's fermentation temperature range. The fermentation process begins, and heavier fermentation emitted $CO_2$ gas 12 purges the original ambient air/oxygen out of the fermentor through the one way venting closure 4 and fills the cavity space 8 with fermentation emitted $CO_2$ gas 12. A manually applied back and forth rocking motion 10 is performed periodically (e.g. once every 1 to 2 days) to stir up yeast lees, wet and punch down any optional fermentable solids, such as grape skins, berries etc. to facilitate colour, flavour, astringency extraction and prevent harmful bacterial growth before moving on to Step 4.
   b) In the open state with access closure 3 removed, fermentable solids, such as grape skins berries etc., if used, are removed through the access opening 2, at or near the completion of fermentation. With the access closure re-engaged to return the fermentor to its closed state, sufficient time is allowed to pass in order to complete the fermentation including the fermentable juice left behind from the removal of the solid fermentables.
   c) With the fermentor in its open state, non fermentables, if used, can be removed at this time or left until step 4. The access cap 3 is re-engaged to the access opening 2 at rim 2a to return the fermentor to its closed state.
   d) Duration time of fermentation generally varies due to desired alcohol content, the particular wine must 9 ingredients being fermented, and the fermentation temperature, typically between 10 and 28, and more particularly between 14 and 21 days in some instances.
   e) Completion of fermentation to the desired sweetness is confirmed by taste sampling or checking the specific gravity of the wine 11 prior to moving ahead with Step 4.
4. Next, with the one-way venting closure removed to achieve the open state of the fermentor, and fermentation stabilizers and fining (clarifying) agent(s) are added through the vent opening, followed by degassing and mixing of other Ingredients in the wine 11. Degassing is important for the clearing and end finish taste of the wine. The degassing of the dissolved $CO_2$ within the body of the wine that would naturally happen over a period of time is assisted in the present invention by agitating and splashing the wine.
   a) Once the fermentation is complete, the cavity space 8 has a substantially free of oxygen environment with heavier-than-air fermentation emitted $CO_2$ gas 12.
   b) With the fermentor in its open state with the access cap 3 removed, non-fermentable ingredients such as oak, if present, are removed through the access opening 2, and the access cap 3 is then installed back over the access opening. The one-way venting closure is removed, once again achieving the open state of the fermentor, and a first dose of one or more fermentation stabilizers and other ingredients provided or desired to enhance the wine are optionally added through the vent opening, after which the one-way venting closure is re-engaged to the vent opening in the access cap to return the fermentor to its closed state.

c) In a first degassing step, a manually applied back and forth rocking motion 10 approximately once per second for at least one minute is applied to the fermentor atop the support surface and creates adequate agitation and splashing of the wine 11. This agitation and splashing mixes in the first does of fermentation stabilizer and other ingredients provided or desired, and degasses the dissolved $CO_2$ gas within the body of the wine 11. The dissolved $CO_2$ gas is physically separated into suspended tiny $CO_2$ gas bubbles that rise and burst out of the wine 11 into the cavity space 8 and out through the one-way venting closure 4. The wine 11 is allowed to rest for three or more minutes, giving time for the suspended tiny $CO_2$ gas bubbles to float up and burst into the cavity space 8. The remaining $CO_2$ gas 12 is retained in the cavity space 8.

d) With the fermentor in its open state with the one-way venting closure 4 removed, an optional additional dose of one or more fermentation stabilizers are added through the vent opening, at which point the one-way venting closure 4 is re-engaged to the access cap 3 to return the fermentor to its closed state.

e) In an additional degassing step, a manually applied back and forth rocking motion 10 approximately once per second for at least one minute minimum is given to the fermentor apparatus atop the support surface, during which agitation and splashing mixes in the optional additional dose of fermentation stabilizer(s) and degasses the dissolved $CO_2$ gas within the body of the wine 11. The dissolved $CO_2$ gas is physically separated into suspended tiny $CO_2$ gas bubbles that rise and burst out of the wine 11 into the cavity space 8 and out through the one-way venting closure 4. The wine 11 is allowed to rest for three or more minutes, giving time for the suspended tiny $CO_2$ gas bubbles to float up and burst into the cavity space 8. The remaining $CO_2$ gas 12 is retained in the cavity space 8.

f) With the fermentor in the open state with the one-way venting closure 4 removed, and a first dose of one or more fining agents are added through the vent opening, at which point the one-way venting closure is re-engaged to the access cap 3 to return the fermentor to its closed state.

g) In an additional degassing step, a manually applied back and forth rocking motion 10 is applied approximately once per second for at least one minute minimum to the fermentor atop the support surface. This agitation and splashing mixes in first dose of fining agent and degasses the dissolved $CO_2$ gas within the body of the wine 11. The dissolved $CO_2$ gas is physically separated into suspended tiny $CO_2$ gas bubbles that rise and burst out of the wine 11 into the cavity space 8 and out through the one way venting closure 4. The wine 11 is allowed to rest for three or more minutes, giving time for the suspended tiny $CO_2$ gas bubbles to float up and burst into the cavity space 8. The remaining $CO_2$ gas 12 is retained in the cavity space 8.

h) With the fermentor in the open state with the one-way venting closure 4 removed, and an optional additional dose of one or more fining agents are added through the vent opening, at which point the access cap 3 is re-engaged to the access cap 3 to seal closed the fermentor.

i) In an additional degassing step, a manually applied back and forth rocking motion 10 is applied approximately once per second for at least one minute minimum to the fermentor atop the support surface. This agitation and splashing mixes in the optional additional dose of fining agent, and degasses the dissolved $CO_2$ within the body of the wine 11. The dissolved $CO_2$ gas is physically separated into suspended tiny $CO_2$ gas bubbles that rise and burst out of the wine 11 into the cavity space 8 and out through the one-way venting closure 4. The wine 11 is allowed to rest for three or more minutes, giving time for the suspended tiny $CO_2$ gas bubbles to float up and burst into the cavity space 8. The remaining $CO_2$ gas 12 is retained in the cavity space 8. Additional degassing can be repeated if required.

5. The wine 11 is left to rest to settle lees 14 and clarify the wine 11. During this step, the fermentation emitted $CO_2$ gas 12 is retained within the cavity space 8 by the one-way venting closure 4 and provides a substantially free of oxygen environment for the wine 11 during the resting/clearing period to settle the lees and clear the wine, which is generally 14 days long.

6. Next, one must ensure the wine 11 is clear and ready to bottle. Once wine 11 is clear, the access cap 3 is removed, and bottling tap 7 is used to fill bottles or other containers directly from the fermentor. During the bottling step, the front end of the fermentor can be gradually lowered down in a stepwise manner using the step-profiled underside of the fermentor tilting prop 13.

From the forgoing, it will be appreciated that by using a single-stage generally horizontal cylindrical fermentor that features an access opening, access cap, bottling tap, vent opening, one way venting closure, cavity space, and is placed generally horizontally atop a counter, table or other horizontal support surface in a manner rockable back and forth thereon, a unique single stage winemaking process can be used to avoid heavy lifting, repetitive messy cleaning, sanitizing, repetitive siphoning, the significant space and equipment requirements and ambient air/oxygen exposure resulting in detrimental oxidization and contamination found in current conventional home winemaking procedures.

While the illustrated embodiment uses a cylindrical shape over a majority of the fermentor to provide suitable convex curvature at the bottom of the fermentor for back and forth rocking motion thereof on the underlying countertop, tabletop or other horizontal support surface, it will be appreciated that other fermentor shapes may instead be employed while still providing such convex curvature at the container's underside at the contact areas thereof with the underlying surface. For example, in the illustrated scenario where the fermentor apparatus only contacts the support surface at the front-end fermentor tilting prop and the opposing rear end of the fermentor, the particular curvature or shape of the fermentor's underside at areas between these two contact points is not significant to the back and forth rocking motion operability of the fermentor apparatus.

While the illustrated embodiment features a relatively large access opening, and a smaller vent opening, alternative embodiments may replace this plurality of openings with a singular opening that serves both as the access opening through which optional solid ingredients are added and removed, and as the vent opening through which original ambient air/oxygen and fermentation-emitted $CO_2$ gas are vented and through which addition of smaller ingredients (stabilizers, finings, etc.) are added. However, in the illustrated embodiment with both a large access opening and a smaller vent opening, using the smaller vent opening to addition and removal of smaller ingredients will minimize the loss of $CO_2$ from the fermentor.

Since various modifications can be made in my invention as herein above described, and many apparently widely different embodiments and other configurations may alternatively be employed of same made, it is intended that all matter contained in the accompanying specification shall be interpreted as illustrative only and not in a limiting sense.

The invention claimed is:

1. A method of wine making in a single stage fermentor having a convexly curved bottom surface residing externally of the fermentor at an underside thereof to enable rocking motion of the fermentor back and forth on a generally horizontal support surface by rolling contact between said convexly curved bottom surface and the support surface, said method comprising the steps of:
   a) with the fermentor in an open state and in a working position supported atop the generally horizontal support surface with a longitudinal axis of the single container lying more parallel than perpendicular to said support surface, combining wine must liquid ingredients in the fermentor in amounts only partially filling said fermentor so as to leave an upper cavity space within said container unoccupied;
   b) with said fermentor in said working position and in a closed state, applying a back and forth rocking motion to the fermentor by rolling contact between the convexly curved bottom surface of the fermentor and the underlying support surface, thereby agitating and splashing said wine must ingredients to perform mixing of the wine must ingredients and inducing/dissolving original ambient air/oxygen yeast nutritional value into the wine must;
   c) with said fermentor in an open state, adding yeast directly onto the wine must inside said fermentor;
   d) with the fermentor once again in the closed state in the working position, maintaining a fermentation temperature range of the yeast to initiate and maintain fermentation, and during said fermentation, periodically re-applying said back and forth rocking motion to stir up yeast lees and wet any solid fermentables present in the fermentor;
   e) during fermentation, using the cavity space to accommodate fermentation created foam and using fermentation emitted heavier $CO_2$ gas from the fermentation to purge original ambient air/oxygen out of the fermentor through a one way venting closure and fill and retain said fermentation emitted $CO_2$ gas within the cavity space, thereby rendering said cavity space substantially free of oxygen;
   f) after an adequate waiting period, ensuring fermentation is complete to a desired sweetness by checking specific gravity or taste sampling the wine, and;
   g) having confirmed fermentation is complete, and with the fermentor in the closed state in the working position and said cavity space substantially free of oxygen, re-applying said back and forth rocking motion to mix and degas the wine through agitation and splashing, thereby releasing dissolved CO2 gas from the wine, and venting the released CO2 gas from the fermentor.

2. The method of claim 1 comprising, between steps (b) and (c), with the fermentor in the open state, introducing solid ingredients into the container.

3. The method of claim 2 comprising introducing said solid ingredients individually contained inside one or more gaze-mesh bags or perforated containers.

4. The method of claim 1 wherein step (g) comprises, with the fermentor in the open state, adding a first dose of one or more stabilizers, and with the fermentor in the closed state in the working position, performing a first mixing and de-gassing of the wine by re-applying said back and forth rocking motion of the fermentor to create adequate agitation and splashing of the wine to thereby mix the first dose of stabilizers and release the dissolved $CO_2$ gas from the wine and through the venting closure, then allowing the wine to rest, during which suspended $CO_2$ gas in the body of the wine floats up and bursts into the cavity space.

5. The method of claim 4 wherein step (g) comprises, with the fermentor in the closed state in the working position, an additional mixing and de-gassing of the wine by re-applying said back and forth rocking motion of the fermentor to create adequate agitation and splashing of the wine and thereby further mix and release the dissolved $CO_2$ gas from the wine and through the venting closure, then allowing the wine to rest, during which suspended $CO_2$ gas in the body of the wine floats up and bursts into the cavity space.

6. The method of claim 5 comprising, with the fermentor in the open state, performing an intermediary step of adding an additional dose of one or more stabilizers between the mixing and degassing steps of claim 4 and or 5.

7. The method of claim 5 wherein step (g) comprises, with the fermentor in the open state after the additional mixing and de-gassing of the wine, adding a first dose of one or more fining agents, and then, with the fermentor in the closed state in the working position, performing a further mixing and degassing step by re-applying said back and forth rocking motion to the fermentor to create adequate agitation and splashing of the wine to thereby mix the stabilizers and finings and release the dissolved $CO_2$ gas from the wine and through the venting closure, then allowing the wine to rest, during which suspended $CO_2$ gas in the body of the wine floats up and bursts into the cavity space.

8. The method of claim 7 wherein step (g) comprises, with the fermentor in the closed state in the working position after the further degassing step, performing yet another mixing and degassing step by re-applying said back and forth rocking motion of the fermentor to create adequate agitation and splashing of the wine to thereby mix the stabilizers and finings and release the dissolved $CO_2$ gas from the wine and through the venting closure, then allowing the wine to rest, during which suspended $CO_2$ gas in the body of the wine floats up and bursts into the cavity space.

9. The method of claim 8 wherein comprising, with the fermentor in the open state, performing an intermediary step of adding an additional dose of one or more fining agents between the further mixing degassing step of claim 7 and the yet another mixing and degassing step of claim 8.

10. The method of claim 2 comprising, with the fermentor in the open state at or near completion of fermentation in step (f), removal of the solid ingredients, then returning the container to the closed state, and allowing sufficient time to pass in order to complete the fermentation.

11. The method of claim 1 wherein the waiting period of step (f) comprises a period of 10 to 28 days to completion of fermentation.

12. The method of claim 1 further comprising, after step (g), leaving the wine to rest to settle lees and clarify the wine, during which the emitted $CO_2$ gas retained within the cavity space by the one-way venting closure provides a safe environment substantially free of oxygen.

13. The method of claim 1 further comprising, after step (g), using a bottling tap on the fermentor to discharge the wine therefrom into external bottles or containers.

14. The method of claim 12 comprising, after leaving the wine to rest and settle lees and clarify the wine, using a bottling tap on the fermentor to discharge the wine therefrom into external bottles or containers.

\* \* \* \* \*